2 Sheets—Sheet 2.
L. BRONSON.
Thrashing Machine.
No. 210,747. Patented Dec. 10, 1878.
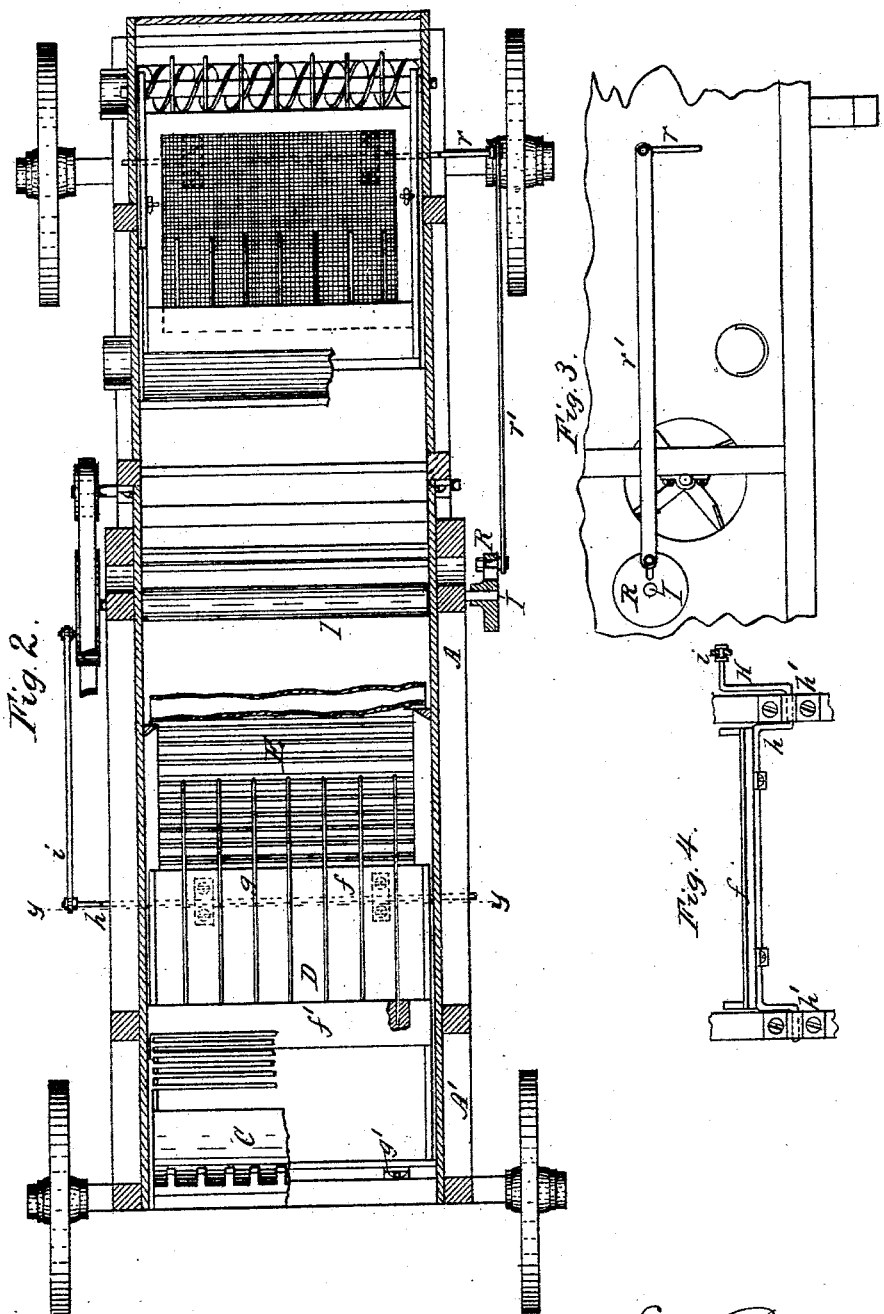

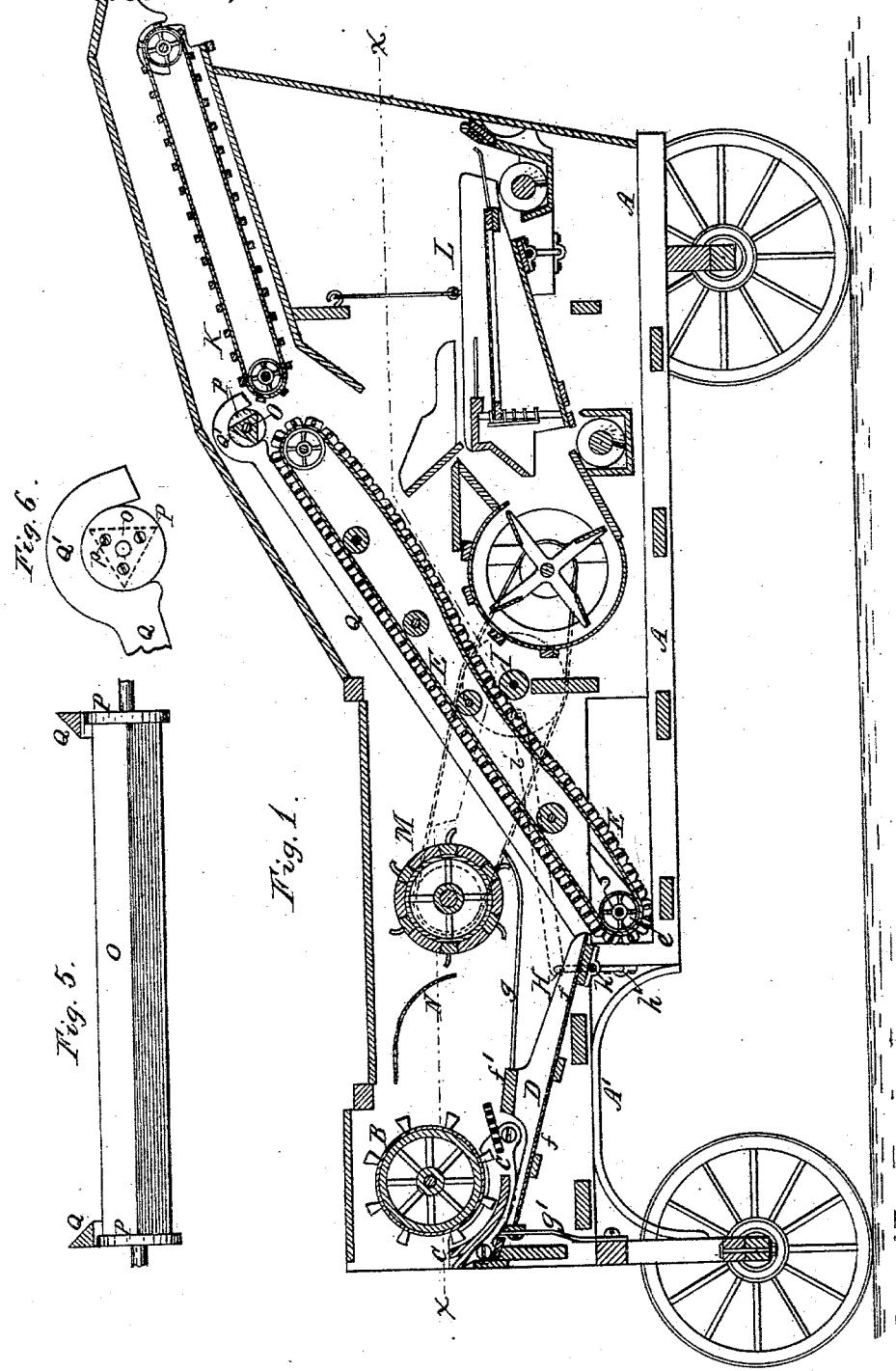

UNITED STATES PATENT OFFICE.

LEVI BRONSON, OF BUFFALO, NEW YORK, ASSIGNOR OF ONE-HALF HIS RIGHT TO THE PITTS AGRICULTURAL WORKS, OF SAME PLACE.

IMPROVEMENT IN THRASHING-MACHINES.

Specification forming part of Letters Patent No. 210,747, dated December 10, 1878; application filed May 4, 1878.

*To all whom it may concern:*

Be it known that I, LEVI BRONSON, of the city of Buffalo, in the county of Erie and State of New York, have invented new and useful Improvements in Thrashing-Machines, of which the following is a specification, reference being had to the accompanying drawings.

My invention relates more especially to that class of thrashing-machines in which an endless cellular belt is used for separating the grain from the straw and elevating the products of the separation respectively to the shaking-shoe and the straw-carrier.

The object of my invention is to enable the machine to effect a more complete separation of the grain from the straw, to prevent the clogging of the parts connecting the cellular belt with the straw-carrier, and to render the machine generally more durable and convenient for use.

My invention consists of the particular construction and arrangement of the parts, as will be hereinafter fully set forth.

In the accompanying drawings, consisting of two sheets, Figure 1 is a longitudinal section of a thrashing-machine provided with my improvements. Fig. 2 is a horizontal section in line $x\,x$ of Fig. 1. Fig. 3 is a fragmentary side elevation of the lower rear part of the machine. Fig. 4 is a cross-section in line $y\,y$, Fig. 2. Fig. 5 is a front elevation of the triangular picker. Fig. 6 is an end view thereof.

Like letters of reference refer to like parts in the several figures.

A represents the main frame of the machine, and A' a forward extension thereof, raised above the bottom sill of the main frame, so as to permit the forward wheels to turn under the extension A'. B is the thrashing-cylinder, and C the concave, of ordinary construction, arranged in the upper portion of the frame-extension A'. D is an inclined shaking grain and straw carrier, arranged underneath the concave C, and extending rearward from the same, for conveying the grain and straw to the cellular belt E. The shaking carrier D is composed of an inclined tight bottom plate, $f$, and a straw rake or separator, $g$, constructed of longitudinal rods or teeth, secured to a cross-piece, $f'$, which is supported on the side pieces of the shaking carrier, above the bottom plate thereof. The forward end of the carrier D is supported on flexible arms $g'$, having their lower ends secured to the extension A' of the frame, and the rear end of the carrier is attached to vibrating arms $h$, supported in bearings $h'$, secured to the main frame A. The carrier is actuated by a rock-arm, H, connecting with one of the supporting-arms $h$, and driven by a connecting-rod, $i$, from a rotating shaft, I.

The foot-pulley $e$ of the cellular endless belt E is arranged in the lower forward corner of the main frame A, so that the tight plate $f$ of the carrier D discharges the thrashed grain upon the belt directly above the pulley $e$, as clearly shown in Fig. 1.

The belt E is constructed in the usual manner, and carried to a suitable height for delivering the straw to the straw-carrier K and the grain to the shaking-shoe L.

M is a toothed cylinder, arranged above the rear end of the straw-rake $g$, so as to sieze the straw as it passes over the rake and throw it upon the upper part of the cellular belt E.

N is a curved hood or deflector, arranged between the thrashing-cylinder B and the toothed cylinder M, for directing the straw and grain upon the rake $g$. O is the triangular rotating picker, arranged between the head of the cellular belt E and the foot of the straw-carrier K, for taking the straw from the belt E and depositing the same upon the carrier K. P P are two circular plates or washers, preferably made of metal, and secured to the ends of the angular picker by screws $p$, or otherwise. Q are the beveled side guards, secured to the casing of the machine on the upper side of the belt E, to prevent the material from escaping over the edges thereof. The guards Q are constructed with extensions Q', encircling the upper sides of the circular plates P, secured to the picker O, so as to prevent the material from wedging between the end of the picker and the case of the machine, and wind around the shaft of the picker or obstruct the bearings thereof.

The shaking-shoe L is constructed in the usual manner, and driven, by means of a rock-arm, $r$, and connecting-rod $r'$, from a crank-wheel, R, mounted on the same shaft, I, which drives the shaking-carrier D. The connecting-rods $i$ and $r'$, by which the carrier D and shoe L are respectively actuated, are connected to the shaft I, or their respective crank-wheels mounted thereon on opposite sides of the shaft, as clearly shown in Fig. 2, whereby the strain upon the main frame from actuating these parts is equalized, and the vibrating of the frame prevented. The pins by which the rods $i$ and $r'$ are attached to their respective crank-wheels are preferably made adjustable therein, so that the throw of the vibrating carrier and shoe can be regulated, one independently of the other, as circumstances may require.

In operating the machine, the grain and straw discharged from the thrashing-cylinder D are deflected by the curved hood N upon the shaking-rake $g$, the grain passing through the spaces between the teeth thereof to the inclined plate $f$ underneath, whence it is delivered upon the endless belt E, while the straw gradually works toward the end of the rake $g$, where it is seized by the teeth of the cylinder M, by which the straw is thrown upon the upper part of the belt. In this manner a very complete separation of the thrashed grain from the straw is effected, the latter lying loosely upon the cells of the belt E, so as to be readily taken off by the picker N.

The arrangement of the grain and straw carrier D between the thrashing-cylinder and the belt E increases the length of the machine considerably, which is very objectionable, as it renders the machine unwieldy and incapable of turning short. This difficulty is however entirely overcome in my improved machine by the raised extension A' of the frame, which permits the front wheels to turn under the machine, and thereby renders the machine capable of turning in a smaller space than shorter machines of ordinary construction.

I claim as my invention—

1. In a thrashing-machine, the main frame A, having the foot-pulley $e$ of the belt E arranged in its lower forward corner, and the forward extension, A', raised above the bottom sill of the main frame to permit the front wheels to turn under the extension A', substantially as shown and described.

2. In a thrashing-machine, the main frame A, having the foot-pulley $e$ of the belt E arranged in its lower forward corner, and the forward extension, A', containing the thrashing mechanism and a grain and straw carrier, and raised above the bottom sill of the main frame to permit the front wheels to turn under the extension A', substantially as shown and described.

3. The combination, with the thrashing-cylinder B, concave C, cellular belt E, and toothed cylinder M, arranged above the lower portion of the belt E, of the shaking grain and straw carrier D, composed of a tight bottom plate, $f$, arranged to deliver the grain upon the foot of the belt E, and a rake, $g$, carrying the straw to the toothed cylinder M, by which the straw is thrown upon the upper portion of the cellular belt, substantially as shown and described.

4. The combination, with the belt E and angular picker O, provided with circular end plates P P, of the side guards Q, constructed with extensions Q' encircling the upper portions of the circular plates P, substantially as and for the purpose set forth.

5. In combination with the thrashing mechanism and cellular belt E, the shaking straw and grain carrier D, arranged between the thrashing mechanism and the belt E, and the shaking-shoe L, arranged on the rear side of the belt E, driving-shaft I, and connecting-rods $i$ $r'$, substantially as shown and described.

LEVI BRONSON.

Witnesses:
EDWARD WILHELM,
JNO. J. BONNER.